(12) United States Patent
Griffin

(10) Patent No.: US 9,298,902 B2
(45) Date of Patent: *Mar. 29, 2016

(54) SYSTEM, METHOD AND PROGRAM PRODUCT FOR RECORDING CREATION OF A CANCELABLE BIOMETRIC REFERENCE TEMPLATE IN A BIOMETRIC EVENT JOURNAL RECORD

(75) Inventor: Phillip H. Griffin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2143 days.

This patent is subject to a terminal disclaimer.

(21) Appl. No.: 12/370,350

(22) Filed: Feb. 12, 2009

(65) Prior Publication Data

US 2010/0205660 A1    Aug. 12, 2010

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/32 | (2013.01) |

(52) U.S. Cl.
CPC ..................... *G06F 21/32* (2013.01)

(58) Field of Classification Search
CPC ..................................... G06F 21/32
USPC ........................................... 726/6
See application file for complete search history.

(56) References Cited

U.S. PATENT DOCUMENTS

| | | | |
|---|---|---|---|
| 5,467,081 A | 11/1995 | Drews et al. | |
| 5,649,099 A | 7/1997 | Theimer et al. | |
| 5,659,616 A | 8/1997 | Sudia | |
| 5,774,552 A | 6/1998 | Grimmer | |
| 6,044,224 A | 3/2000 | Radia et al. | |
| 6,092,201 A | 7/2000 | Turnbull et al. | |
| 6,256,737 B1 | 7/2001 | Bianco et al. | |
| 6,554,188 B1 | 4/2003 | Johnson et al. | |

(Continued)

FOREIGN PATENT DOCUMENTS

| | | |
|---|---|---|
| WO | 0065770 | 11/2000 |
| WO | WO 2005/122467 | 12/2005 |

OTHER PUBLICATIONS

Amendment filed Jun. 4, 2012 in response to Office Action (Mail Date Mar. 6, 2012) for U.S. Appl. No. 12/370,334, filed Feb. 12, 2009.

(Continued)

*Primary Examiner* — Dant Shaifer Harriman
(74) *Attorney, Agent, or Firm* — Schmeiser, Olsen & Watts, LLP; Matthew Chung

(57) ABSTRACT

A system, method and program product for recording the creation of a cancelable biometric reference template in a biometric event journal record. The method includes providing a base biometric reference template having a unique base reference template identifier that uniquely identifies base biometric data collected for an individual, applying a data transform function having a first function key value to the base biometric reference template to create one cancelable biometric reference template and recording the one cancelable biometric reference template in a biometric event journal record. The method further includes creating additional cancelable biometric reference templates using different function key values of the data transform function. The method further includes encrypting the data transform function and the function key value applied to the base biometric reference template. The method further includes signing the cancelable biometric reference template and signing the biometric event journal with a digital signature.

20 Claims, 7 Drawing Sheets

(56) References Cited

U.S. PATENT DOCUMENTS

| | | | |
|---|---|---|---|
| 6,836,554 B1* | 12/2004 | Bolle et al. | 382/116 |
| 7,030,760 B1 | 4/2006 | Brown | |
| 7,062,654 B2 | 6/2006 | Millen et al. | |
| 7,120,607 B2 | 10/2006 | Bolle et al. | |
| 7,298,243 B2 | 11/2007 | Juels et al. | |
| 7,302,583 B2 | 11/2007 | Forrest | |
| 7,310,734 B2 | 12/2007 | Boate et al. | |
| 7,464,162 B2 | 12/2008 | Chan | |
| 7,627,895 B2* | 12/2009 | Gifford et al. | 726/9 |
| 7,671,746 B2 | 3/2010 | Martinez de Velasco Cortina et al. | |
| 7,739,744 B2 | 6/2010 | Burch et al. | |
| 7,788,500 B2 | 8/2010 | Okamura et al. | |
| 7,827,399 B1 | 11/2010 | Sheretov et al. | |
| 7,936,905 B2 | 5/2011 | Takahashi et al. | |
| 8,001,387 B2* | 8/2011 | Lee et al. | 713/186 |
| 8,086,867 B2 | 12/2011 | Freeman et al. | |
| 8,242,892 B2 | 8/2012 | Griffin | |
| 8,327,131 B1 | 12/2012 | Hardjono et al. | |
| 2002/0026582 A1 | 2/2002 | Futamura et al. | |
| 2002/0174010 A1 | 11/2002 | Rice | |
| 2003/0088782 A1 | 5/2003 | Forrest | |
| 2003/0093666 A1 | 5/2003 | Millen et al. | |
| 2003/0097383 A1 | 5/2003 | Smirnov et al. | |
| 2003/0115490 A1 | 6/2003 | Russo et al. | |
| 2003/0126433 A1 | 7/2003 | Hui | |
| 2003/0129965 A1 | 7/2003 | Siegel | |
| 2004/0019570 A1 | 1/2004 | Bolle et al. | |
| 2004/0020984 A1 | 2/2004 | Clark | |
| 2004/0049675 A1 | 3/2004 | Micali et al. | |
| 2004/0123114 A1 | 6/2004 | McGowan | |
| 2004/0162984 A1 | 8/2004 | Freeman et al. | |
| 2004/0193893 A1 | 9/2004 | Braithwaite et al. | |
| 2005/0005136 A1 | 1/2005 | Chen et al. | |
| 2005/0055582 A1 | 3/2005 | Bazakos et al. | |
| 2005/0180619 A1 | 8/2005 | McClurg et al. | |
| 2005/0198508 A1 | 9/2005 | Beck | |
| 2005/0228998 A1 | 10/2005 | Chan et al. | |
| 2005/0229007 A1 | 10/2005 | Bolle et al. | |
| 2005/0240778 A1 | 10/2005 | Saito | |
| 2005/0283614 A1 | 12/2005 | Hardt | |
| 2006/0078171 A1* | 4/2006 | Govindaraju et al. | 382/115 |
| 2006/0104484 A1 | 5/2006 | Bolle et al. | |
| 2006/0158751 A1 | 7/2006 | McClurg et al. | |
| 2006/0206723 A1 | 9/2006 | Gil et al. | |
| 2006/0289646 A1 | 12/2006 | Shafer | |
| 2007/0040654 A1 | 2/2007 | Lee et al. | |
| 2007/0044139 A1 | 2/2007 | Tuyls et al. | |
| 2007/0119924 A1 | 5/2007 | Register, Jr. et al. | |
| 2007/0136581 A1 | 6/2007 | Hoghaug et al. | |
| 2007/0164863 A1 | 7/2007 | Himberger et al. | |
| 2007/0180261 A1 | 8/2007 | Akkermans et al. | |
| 2007/0226512 A1 | 9/2007 | Kevenaar et al. | |
| 2008/0037833 A1 | 2/2008 | Takahashi et al. | |
| 2008/0065895 A1* | 3/2008 | Liu et al. | 713/176 |
| 2008/0072284 A1 | 3/2008 | Horvitz et al. | |
| 2008/0157927 A1 | 7/2008 | Soppera et al. | |
| 2008/0162943 A1 | 7/2008 | Ali et al. | |
| 2008/0169909 A1 | 7/2008 | Park et al. | |
| 2009/0022374 A1 | 1/2009 | Boult | |
| 2009/0239503 A1 | 9/2009 | Smeets | |
| 2009/0271635 A1 | 10/2009 | Liu et al. | |
| 2010/0201489 A1 | 8/2010 | Griffin | |
| 2010/0205431 A1 | 8/2010 | Griffin | |
| 2010/0205452 A1 | 8/2010 | Griffin | |
| 2010/0205658 A1 | 8/2010 | Griffin | |
| 2010/0205660 A1 | 8/2010 | Griffin | |

OTHER PUBLICATIONS

Amendment filed May 24, 2012 in reponse to Advisory Action (Mail Date May 14, 2012) for U.S. Appl. No. 12/370,345, filed Feb. 12, 2009.
Notice of Allowance (Mail Date May 30, 2012) for U.S. Appl. No. 12/370,345, filed Feb. 12, 2009.
Amendment filed May 8, 2012 in response to Final Office Action (Mail Date Mar. 9, 2012) for U.S. Appl. No. 12/370,345, filed Feb. 12, 2009.
Advisory Action (Mail Date May 14, 2012) for U.S. Appl. No. 12/370,345, filed Feb. 12, 2009.
Final Office Action (Mail Date May 14, 2012) for U.S. Appl. No. 12/370,379, filed Feb. 12, 2009.
U.S. Appl. No. 13/611,000, filed Sep. 12, 2012.
Notice of Allowance (Mail Date Sep. 12, 2012) for U.S. Appl. No. 12/370,379, filed Feb. 12, 2009.
Griffin, P., ISO 19092: A Standard for Biometric Security Management, ISSA Journal, Jan. 2007, pp. 20-23.
Griffin, P., U.S. Appl. No. 12/370,345, System, Method and Program Product for Associating a Biometric Reference Template With a Radio Frequency Identification Tag, filed on Feb. 12, 2009.
Griffin, P., U.S. Appl. No. 12/370,359, System, Method and Program Product for Communicating a Privacy Policy Associated With a Biometric Reference Template, filed on Feb. 12, 2009.
Griffin, P., U.S. Appl. No. 12/370,365, System, Method and Program Product for Communicating a Privacy Policy Associated With a Radio Frequency Identification Tag and Associated Object, filed on Feb. 12, 2009.
Griffin, P., U.S. Appl. No. 12/370,379, System, Method and Program Product for Generating a Cancelable Biometric Reference Template on Demand, filed on Feb. 12, 2009.
Griffin, P., U.S. Appl. No. 12/370,334, System, Method and Program Product for Checking Revocation Status of a Biometric Reference Template, filed on Feb. 12, 2009.
Berners-Lee, T. et al., Uniform Resource Identifiers (URI): Generic Syntax, RFC 2396, http://ietfreport.isoc.org/rfc/rfc2396.txt, Aug. 1998, pp. 1-40.
Ratha, N. K. et al, Generating Cancelable Fingerprint Templates, IEEE Transactions on Pattern Analysis and Machine Intelligence, vol. 29, No. 4, Apr. 2007.
Advisory Action (Mail Date Jul. 26, 2012) for U.S. Appl. No. 12/370,379, filed Feb. 12, 2009.
Request for Continued Examination filed Aug. 14, 2012 for U.S. Appl. No. 12/370,379, filed Feb. 12, 2009.
Notice of Allowance (Mail Date Jul. 26, 2012 for U.S. Appl. No. 12/370,334, filed Feb. 12, 2009.
Ratha, et al.; Generating Cancelable Fingerprint Templates; IEEE Transactions on Pattern Analysis and Machine Intelligence; vol. 29, No. 4; Apr. 2007; pp. 561-572.
Molnar, et al.; Privacy for RFID Through Trusted Computing; WPES '05; Nov. 7, 2005; Alexandria, Virginia; pp. 31-34.
Juels, et al.; Soft Blocking: Flexible Blocker Tags on the Cheap; WPES '04; Oct. 28, 2004; Washington, D.C.; pp. 1-7.
Office Action (Mail Date Nov. 9, 2011) for U.S. Appl. No. 12/370,359, filed Feb. 12, 2009.
Amendment filed Feb. 9, 2012 in response to Office Action (Mail Date Nov. 9, 2011) for U.S. Appl. No. 12/370,359, filed Feb. 12, 2009.
Office Action (Mail Date Nov. 17, 2011) for U.S. Appl. No. 12/370,365, filed Feb. 12, 2009.
Amendment filed Feb. 9, 2012 in response to Office Action (Mail Date Nov. 17, 2011) for U.S. Appl. No. 12/370,365, filed Feb. 12, 2009.
Office Action (Mail Date Sep. 27, 2011) for U.S. Appl. No. 12/370,379, filed Feb. 12, 2009.
Amendment filed Dec. 22, 2011 in response to Office Action (Mail Date Sep. 27, 2011) for U.S. Appl. No. 12/370,379, filed Feb. 12, 2009.
Office Action (Mail Date Jul. 13, 2011) for U.S. Appl. No. 12/370,334, filed Feb. 12, 2009.
Amendment filed Sep. 22, 2011 in response to Office Action (Mail Date Jul. 13, 2011) for U.S. Appl. No. 12/370,334, filed Feb. 12, 2009.
Final Office Action (Mail Date Oct. 12, 2011) for U.S. Appl. No. 12/370,334, filed Feb. 12, 2009.
Amendment and Request for Continued Examination filed Jan. 11, 2012 in response to Final Office Action (Mail Date Oct. 12, 2011) for U.S. Appl. No. 12/370,334, filed Feb. 12, 2009.

(56) References Cited

OTHER PUBLICATIONS

Notice of Allowance (Mail Date Mar. 30, 2012) for U.S. Appl. No. 12/370,365, filed Feb. 12, 2009.
Office Action (Mail Date Mar. 6, 2012) for U.S. Appl. No. 12/370,334, filed Feb. 12, 2009.
Final Office Action (Mail Date Mar. 9, 2012) for U.S. Appl. No. 12/370,345, filed Feb. 12, 2009.
Notice of Allowance (Mail Date Jun. 21, 2012) for U.S. Appl. No. 12/370,359, filed Feb. 12, 2009.
Amendment filed Jul. 13, 2012 in response to Final Office Action (Mail Date May 14, 2012) for U.S. Appl. No. 12/370,379, filed Feb. 12, 2009.
ITU-T Telecommunication Standardization Sector of ITU, X.667, Series X: Data Networks and Open System Communications—OSI networking and system aspects—Naming, Addressing and Registration, ISO/IEC 9834-8: 2005 (E), 34 pages, Geneva, Switzerland 2005.
ITU-T Telecommunication Standardization Sector of ITU, X.667, Series X: Data Networks and Open System Communications—OSI networking and system aspects—Abstract Syntax Notation One (ASN.1), ISO/IEC 8824-1:2003 (E), 146 pages, Geneva, Switzerland 2005.
Notice of Allowance (Mail Date Feb. 12, 2014) for U.S. Appl. No. 13/611,000, filed Sep. 12, 2012.
IEEE Xplore, Retrieved from Internet: http://ieeexplore.ieee.org/search/searchresult.jsp?action=search&sortType=&rowsPerPage=...; Feb. 3, 2014, 1 page.
Office Action (Mail Date Oct. 11, 2013) for U.S. Appl. No. 13/611,000, filed Sep. 12, 2012.

* cited by examiner

SYSTEM, METHOD AND PROGRAM PRODUCT FOR RECORDING CREATION OF A CANCELABLE BIOMETRIC REFERENCE TEMPLATE IN A BIOMETRIC EVENT JOURNAL RECORD

FIELD OF THE INVENTION

The present invention relates to computer systems and software, and more specifically to a technique for recording in a biometric event journal record the creation of a cancelable or revocable or derivative biometric reference template, created from a base biometric reference template.

BACKGROUND OF THE INVENTION

A biometric event journal is a series of biometric information security management system event records. These records are used to monitor, control and perfect the security of a biometric authentication or identification system in an ongoing Plan-Do-Check-Act management process. Biometric event journal records are defined in the X9.84 and ISO 19092 biometrics security standards. Event types include the successful enrollment of an individual in a biometric system. An enrollment event involves collecting a biometric sample from an individual and processing the sample into biometric data that is used to create a biometric reference template. This reference template can later be used to match an individual to future biometric samples. When an individual succeeds in enrolling in a biometric system, a biometric reference template is created and the enrollment event is recorded in a biometric event journal. However, there is no process for recording events pertaining to the creation of a reference template that occur after the enrollment process. As such, there is a need for recording biometric events that take place after the enrollment stage.

SUMMARY OF THE INVENTION

The present invention resides in a system, method and program product for recording the creation of a cancelable or revocable or derivative biometric reference template in a biometric event journal, in accordance with an embodiment of the invention. The method for recording creation of a cancelable biometric reference template includes providing a base biometric reference template having a unique base biometric reference template identifier that uniquely identifies base biometric data collected for an individual, applying a data transform function having a first function key value to the base biometric reference template to create at least one cancelable biometric reference template and recording the at least one cancelable biometric reference template in a biometric event journal record. In an embodiment, the method further includes signing the at least one cancelable biometric reference template with a digital signature. In an embodiment, the method further includes signing the biometric event journal record with a digital signature. In an embodiment, the recording step further includes encrypting the data transform function applied to the base biometric reference template and encrypting the function key value applied to the base biometric reference template. In an embodiment, the recording step further includes encrypting the data recorded in the biometric event journal record. In an embodiment, the biometric event journal record includes at least one of: a respective biometric reference template, one or more cancelable biometric reference templates created from the respective biometric reference template, a respective data transform function and a respective data transform function key value.

In another aspect, the invention provides a computer system for recording creation of a cancelable biometric reference template. The system includes a network communications channel, a biometric system having a central processing unit and coupled to the network communications channel, the biometric system further includes a biometric application for creating a base biometric reference template having a unique biometric reference template identifier that uniquely identifies biometric data collected for an individual, a transformation tool including a data transform function having at least one function key value for creating at least one cancelable biometric reference template from the base biometric reference template, the cancelable biometric reference template including a unique identifier for identifying the at least one cancelable biometric reference template created and a journaling tool for recording creation of the at least one cancelable biometric reference template created in a biometric event journal. The computer system further includes an authentication tool for signing the at least one cancelable biometric reference template created. In an embodiment, the biometric event journal record is signed with a digital signature using the authentication tool. In an embodiment, the data transformation function includes additional function key values for creating additional cancelable biometric reference templates from the base biometric reference template. The computer system further includes an attribute tool for creating an attribute for identifying a respective unique identifier assigned to a respective cancelable biometric reference template for uniquely identifying the respective cancelable biometric reference template. In an embodiment, a respective unique identifier identifying a respective cancelable biometric reference template is stored in the biometric event journal. In an embodiment, the biometric event journal record includes at least one of: a respective biometric reference template, one or more cancelable biometric reference templates created from the respective biometric reference template, a respective data transform function and a respective data transform function key value.

In yet another aspect, the invention provides a computer program product for recording creation of a cancelable biometric reference template. The computer program product includes a computer readable storage medium, first program instructions to provide a base biometric reference template having a unique base biometric reference template identifier that uniquely identifies base biometric data collected for an individual, second program instructions to apply a data transform function having a first function key value to the base biometric reference template to create at least one cancelable biometric reference template and third program instructions to record the at least one cancelable biometric reference template in a biometric event journal record and where the first, second and third program instructions are recorded on the computer readable storage medium. The computer program product according to claim 15, further includes fourth program instructions to sign the at least one cancelable biometric reference template created with a digital signature, where the fourth program instructions are recorded on the computer readable storage medium. In an embodiment, the second program instructions include instructions to create a second cancelable biometric reference template from the base biometric reference template using the data transform function having a second function key value. In an embodiment, the third program instructions include instructions to encrypt the data transformation function and to encrypt the function key value applied to the base biometric reference template. In an embodiment, the fourth program instructions include instructions to sign the biometric event journal record created. In an embodiment, the biometric event journal record includes at least one of: a respective biometric reference template, one or more cancelable biometric reference templates created from the respective biometric reference template, a respective data transform function and a respective data transform function key value.

In yet another aspect, the invention provides a process for deploying computing infrastructure including integrating computer-readable code into a computing system, where the code in combination with the computing system is capable of performing a process for recording creation of a cancelable biometric reference template. The process includes providing a base biometric reference template having a unique base biometric reference template identifier that uniquely identifies base biometric data collected for an individual, applying a data transform function having a first function key value to the base biometric reference template to create at least one cancelable biometric reference template and recording the at least one cancelable biometric reference template in a biometric event journal record. Further, the process includes signing the at least one cancelable biometric reference template with a digital signature. Furthermore, the process includes signing the biometric event journal record with a digital signature. In an embodiment, the recording step further includes encrypting the data transform function applied to the base biometric reference template and encrypting the function key value applied to the base biometric reference template. In an embodiment, the biometric event journal record includes at least one of: a respective biometric reference template, one or more cancelable biometric reference templates created from the respective biometric reference template, a respective data transform function and a respective data transform function key value.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
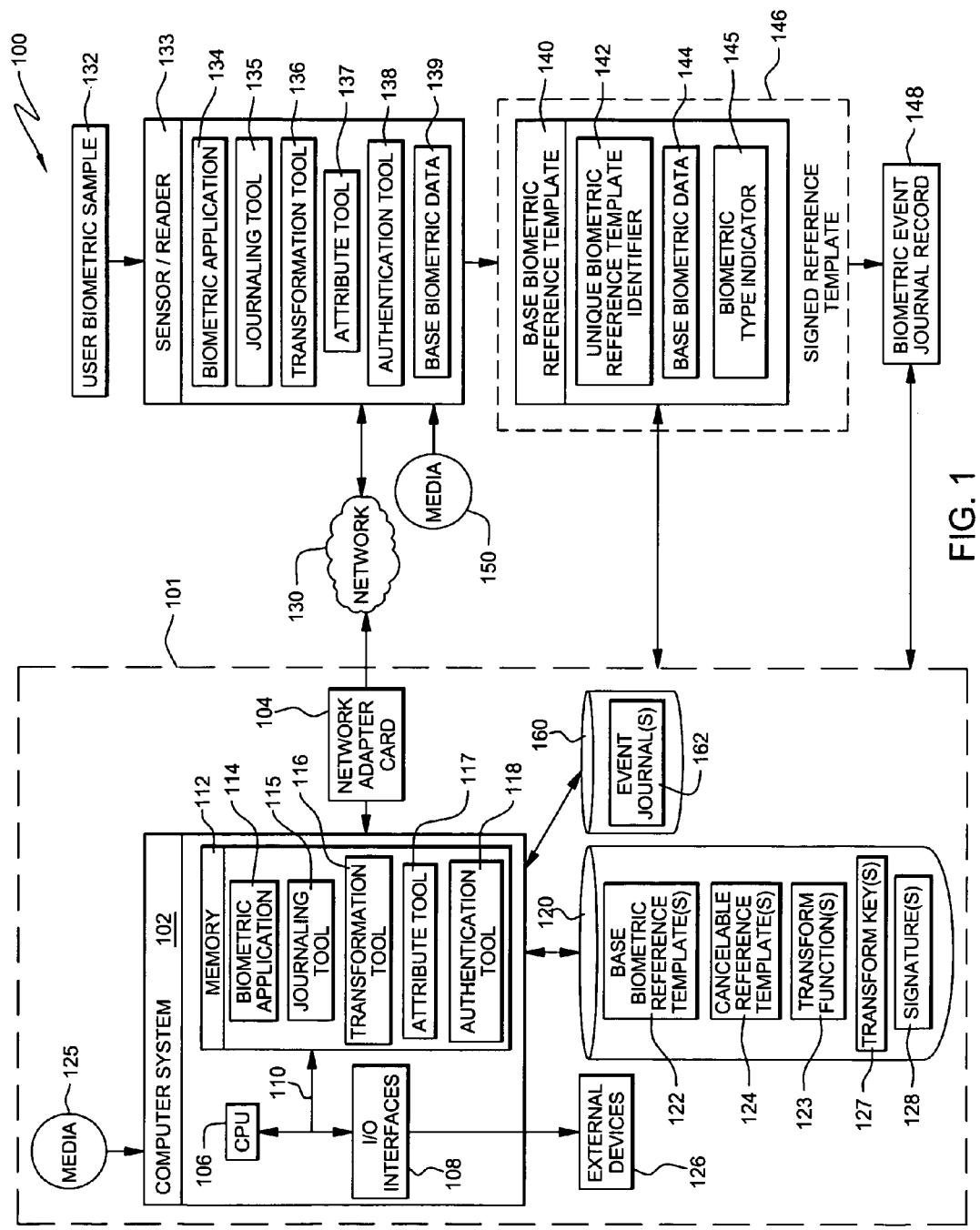
FIG. 1 depicts an embodiment of a computer infrastructure for recording the creation of a cancelable or revocable or derivative biometric reference template in a biometric event journal record, in accordance with an embodiment of the present invention.

In one embodiment, the invention provides a computer infrastructure 100 that includes a computer system 102 for recording the creation of a cancelable or revocable or derivative biometric reference template in a biometric event journal record, in accordance with an embodiment of the invention. In an embodiment, as depicted in FIG. 1, computer system or server 102 that has a biometric application 114 deployed thereon and is intended to represent any type of computer system that is maintained in a secure environment, that is, for which access control is enforced (as represented by the dotted lines indicated by reference numeral 101). In an embodiment, the biometric application 114 deployed on the computer system 102 is loaded into memory 112 of the computer system 102 from a computer readable storage medium or media (reference numeral 125), such as, a magnetic tape or disk, optical media, DVD, memory stick, semiconductor memory, etc. or downloaded from the server via a network adapter card (reference numerals 104) installed on the computer system or server 102. Referring to FIG. 1, the computer system or server 102 is shown to include a CPU (Central CPU) 106, a memory 112, a bus 110, and input/output (I/O) interfaces 108. Further, the server 102 is shown in communication with external I/O devices/resources 126 and databases 120 and 160. In general, CPU 106 executes computer program code stored in memory 112, such as the biometric application 114 for processing biometric data 139 contained in a biometric sample 132. In an embodiment, the memory 112 includes a journaling tool 115 for recording or journaling events within the biometric system, such as, the creation of a base biometric reference template 140 and/or the creation of one or more revocable or derivative or cancelable biometric reference templates, as explained further herein below with respect to FIGS. 2 and 3. The memory 112 further includes a transformation tool or engine 116 for transforming a base biometric reference template 140 into one or more cancelable biometric reference templates 220, as explained further herein below with respect to FIGS. 2 and 3. In an embodiment, the transformation tool 116 includes one or more transform functions having one or more transform keys for creating one or more derivative or cancelable or revocable biometric reference templates from a base biometric reference template, as discussed further herein below. Further, in an embodiment, the transformation tool 116 stores the transform functions (reference numeral 123) and transform keys (reference numeral 127) utilized to create the one or more cancelable or revocable or derivative biometric reference templates in database 120. Furthermore, in an embodiment, the transformation tool 116 records the creation of the base biometric reference template 140 in a biometric event journal record, reference numeral 148, (also referred to herein as an "event journal" or "an audit log"), which in an embodiment are stored in database 160 (as "event journal(s)", reference numeral 162) in database 160 within infrastructure 101. Further, memory 112 stores an attribute tool 117 for creating or defining one or more attributes to be included in the base biometric reference template (also referred to herein as simply "biometric reference template" or "reference template" or "base template" or "base reference template") that is created using an individual's biometric sample. Furthermore, the memory 112 stores an authentication tool 118 for signing a base biometric reference template and/or attributes associated with the base biometric reference template. In an embodiment, the base biometric reference template 140 that is created using a biometric sample 132 collected from an individual is stored in database 120, along with other base biometric reference templates within computer system or server 102 (referred to as "base biometric reference template (s), reference numeral 122). Further, in an embodiment, the one or more derivative or cancelable or revocable biometric reference templates are stored as cancelable reference templates 124 in database 120. In an embodiment, one or more unique identifiers, for instance, the unique base biometric reference template identifier 142 that uniquely identifies a base biometric reference template 140 may be stored in database 120. Further, in an embodiment, any biometric data and/or information processed by the biometric sensor or reader device 133 are transmitted over a network 130 to the computer system or server 102 for storage in database 120. In particular, as shown in FIG. 1, a user or individual provides a biometric sample 132 using a biometric sensor or a biometric reader or scanning device 133 coupled to the system 102. In an embodiment, the biometric sensor or reader or scanner 133 converts the scanned user biometric sample 132 to a digital form using an instance 134 of the biometric application 114. In an embodiment, an instance 134 of the biometric application 114 deployed on the computer system 102 is loaded into the sensor or reader device 133 within the biometric infrastructure 100 from a computer readable storage medium or media (reference numeral 150), such as, a magnetic tape or disk, optical media, DVD, memory stick, semiconductor memory, etc. or downloaded from the server via a network adapter card (reference numerals 104) installed on the computer system or server 102. Further, an instance 135 of the journaling tool 115 and an instance 136 of the transformation tool 116 is loaded into the sensor or reader device 133 from a computer readable storage medium or media (reference numeral 150), such as, a magnetic tape or disk, optical media, DVD, memory stick, semiconductor memory, etc. or downloaded from the server via a network adapter card (reference numerals 104) installed on the computer system or server 102. Similarly, an instance 137 of the attribute tool 116 and an instance 138 of the authentication tool 118 are loaded into the sensor or reader device 133 within the biometric infrastructure 100 from a computer readable storage medium or media (reference numeral 150), such as, a magnetic tape or disk, optical media, DVD, memory stick, semiconductor memory, etc. or downloaded from the server via a network adapter card (reference numerals 104) installed on the computer system or server 102. In particular, the instance 134 of the biometric application 114 loaded into the biometric sensor or reader device 133 is used to process the biometric sample 132 collected from a person or an individual or user into biometric data 139, which, in an embodiment, is stored within the biometric sensor or reader device 133. Further, the biometric data 139 processed by the sensor or reader device 133 is used to create a base biometric reference template 140. In an embodiment, the sensor or reader device 133 uses the attribute tool or program 137 for creating one or more attributes to be associated with or attached to the base biometric reference template 140. Further, the sensor or reader device 133 uses the authentication tool or program 138 for signing the base biometric reference template that is created, referred to as "signed reference template", shown by dotted lines 146. Further, the authentication tool 138 is used to sign any attributes that are associated with and/or included in a base biometric reference template 140. In an embodiment, the base biometric reference template 140 created is assigned a unique base biometric reference template identifier 142 (also referred to herein simply as "base template identifier") for uniquely identifying the base biometric reference template 140 created using a person's base biometric data 139 that is processed from the person's biometric sample 132. In an embodiment, the unique base template identifier 142 is created in the form of an information object identifier (OID) as defined in ISO/IEC 8824-1 and ISO/IEC 9834-8, a universally unique identifier (UUID) as defined in ISO/IEC 9834-8, or a uniform resource identifier (URI) as defined in RFC 2396. Further, in an embodiment, the base biometric data 139 that is processed using a biometric sample 132 provided by an individual is associated with the base biometric reference template 140 and is included in the base biometric reference template 140 itself, shown as base biometric data 144. In an embodiment, the base biometric data 144 stored within the base biometric reference template 140 is encrypted or protected in some manner, such as signing the entire base biometric reference template 140 (shown as dotted lines 146), as discussed further herein below. In an embodiment, the biometric reference template 140 includes a "biometric type indicator" component (reference numeral 145) that provides an indication of the type of biometric data used to create the base biometric reference template, for example, fingerprint, iris or retinal scan, etc. Further, the base biometric reference template 140 may include one or more attributes, such as, a privacy policy attribute, which includes a unique privacy policy identifier that identifies a privacy policy that is associated with the base biometric reference template 140, such that, the privacy policy informs a recipient of the intended and proper handling and use of the information contained in the base biometric reference template 140. In an embodiment, the base biometric reference template 140 that is created using a biometric sample 132 provided by a user is stored in a database 120 of the system 102 along with other base biometric reference templates 122 created for other users or individuals within the infrastructure 101. In an embodiment, the base biometric data contained within each of the base biometric reference templates 122 stored within database 120 within the system 102 is encrypted to protect the identities of the individuals that the base biometric reference templates belong to. Further, in an embodiment, each of the base biometric reference templates is signed with a digital signature before being stored in database 120, and the digital signatures (reference numeral 128) are also stored in database 120. Additionally, the journaling tool 135 deployed on the sensor or reader 133 is used to record in a biometric event journal record 148 the creation of the base biometric reference template 140, which is stored in database 160 within infrastructure 101. It should be understood, however, that although not shown, other hardware and software components (e.g., additional computer systems, routers, firewalls, etc.) could be included in infrastructure 100.

Figure 2:
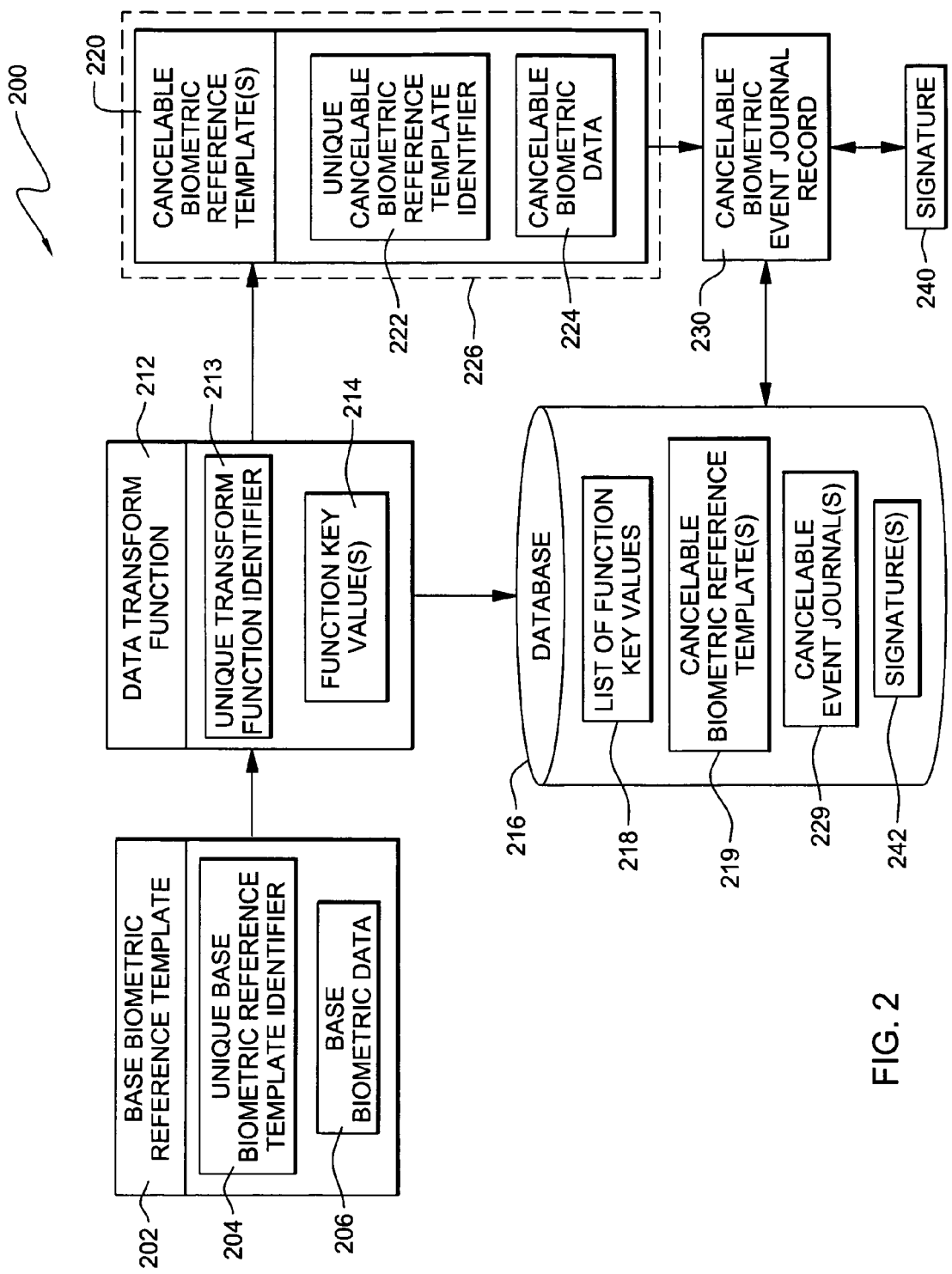
FIG. 2 is a block diagram depicting an aspect of a computer infrastructure for creating a cancelable or revocable or derivative biometric reference template from a biometric reference template, in accordance with an embodiment of the present invention.

Reference is now made to FIG. 2, reference numeral 200, which depicts an aspect of a computer infrastructure having deployed thereon a transformation tool or program that includes one or more data transform functions having one or more function key values for creating a cancelable or revocable or derivative biometric reference template from a base biometric reference template, in accordance with an embodiment of the present invention. In an embodiment, the base biometric reference template 202 having a unique base biometric reference template identifier 204 and which includes base biometric data 206 is inputted into a data transformation function or algorithm 212 provided by a transformation tool (reference numeral 116 as shown in FIG. 1) deployed on a computer system within infrastructure 200. In an embodiment, the transformation tool includes a data transform function or algorithm 212 (also referred to herein as "data transformation function" or "transform function" or "data transformation function"), which is loaded on to a computer device or computer system within the infrastructure 200. In an embodiment, the data transformation function 212 includes a matrix of function key values 214 (also referred to herein as "transform keys", "transformation keys" or "transform values" or "function key values"), where a different transformation key is used to create a different cancelable or revocable or derivative biometric reference template 220. The base biometric reference template 202 is used as an input to the data transformation function 212 in order to create a cancelable or revocable or derivative biometric reference template 220. Known transform techniques or functions in the art can be used to transform the base biometric reference template created using the base biometric data taken from a single enrollment of an individual in a system to create multiple, cancelable or revocable or derivative biometric reference templates by varying the seed values (transformation keys or function key values) of a transformation function. In an embodiment, the data transformation function 212 is assigned a unique transform function identifier 213 for identifying the data transformation function used to create a particular cancelable or revocable or derivative biometric reference template. Further, in an embodiment, the unique transform function identifier 213 identifying a particular data transformation function 212 and the particular transformation key 214 to create a particular cancelable or revocable or derivative biometric reference template are tracked in a function key value list 218 stored in a database 216 to ensure that the same transform key 214 is not used twice. In an embodiment, the cancelable or revocable or derivative biometric reference template 220 that is created using a transform key 214 of the data transformation function 212 is assigned a unique cancelable or revocable or derivative biometric reference template identifier 222 for identifying the cancelable or revocable or derivative biometric reference template, as shown in FIG. 2. Further, the cancelable or revocable or derivative biometric reference template 220 includes cancelable biometric data 224 transformed from the base biometric data 206 in the base biometric reference template 202. The transform values 214 applied to a base biometric reference template 202 is chosen from a matrix of integer values and can be varied to create multiple cancelable or revocable or derivative biometric reference templates 220. Each cancelable or revocable or derivative biometric reference template 220 that is created is assigned its own unique cancelable or revocable or derivative biometric reference template identifier 222 that identifies the respective cancelable or revocable or derivative biometric reference template 220. In an embodiment, the new cancelable or revocable or derivative biometric reference template adheres to international standards for the format of biometric reference templates and, as such, the unique cancelable or revocable or derivative biometric reference template identifier comprises a universally unique identifier (UUID). In an embodiment, the cancelable biometric reference templates 220 that are created are stored in database 216, referred to by reference numeral 219. Also, in an embodiment, the data transform function 212 and the database 216 are part of a secure environment within infrastructure 200, similar to the secure environment 101 shown in FIG. 1. Further, as shown in FIG. 2, the cancelable biometric event journal record 230 recording or journaling the creation of the cancelable biometric reference template is stored in database 216, as cancelable event journal(s) or journal records, reference numeral 229. Further, the cancelable biometric reference template 220 is signed with a digital signature (represented by the dotted lines 226) before being stored in database 216, and the digital signature is stored with other digital signature(s) (reference numeral 242) in database 216. In an embodiment, a RSA digital signature scheme is used to sign a cancelable biometric reference template 220, such that, the digital signature provides integrity protection over the entire cancelable biometric reference template 220. As such, a digital signature can be used to detect if any of the cancelable biometric reference template information has been tampered with. In particular, the act of digitally signing the entire cancelable biometric reference template 220 cryptographically binds every component within the cancelable biometric reference template together. Further, if a biometric reference template contains any attributes, then such attributes are also cryptographically bound to the cancelable biometric reference template. In an embodiment, to form a digital signature on an information object, such as, a cancelable biometric reference template, a cryptographic hash (also referred to herein as "encrypted hash" or "hash value" or simply "hash") is computed over the entire object or cancelable biometric reference template and then the hash is signed. For example, where a RSA digital signature scheme is used to sign a cancelable biometric reference template, a key is used to encrypt the hash to form the digital signature. Furthermore, in an embodiment, the signed cancelable biometric reference template is stored along with the digital signature in a database, for example, database 216. Furthermore, in an alternate embodiment, the digital signature may be detached from the cancelable biometric reference template (not appended to or associated with the cancelable biometric reference template as shown in FIG. 2). Further, in an embodiment, the data recorded in a cancelable biometric event journal record 230 is encrypted before the cancelable event journal is stored (reference numeral 229) in database 216. Furthermore, in an embodiment, the cancelable biometric event journal record 230 is signed with a digital signature 240 before being stored in database 216, and the digital signature is also stored (reference numeral 242) in database 216. In an embodiment, a RSA digital signature scheme is used to sign the cancelable biometric event journal record 230, such that, the digital signature provides integrity protection over the entire cancelable biometric event journal record 230. The use of digital signatures to sign objects to be authenticated is well known in the art and, as such, will not be discussed further herein.

Figure 3:
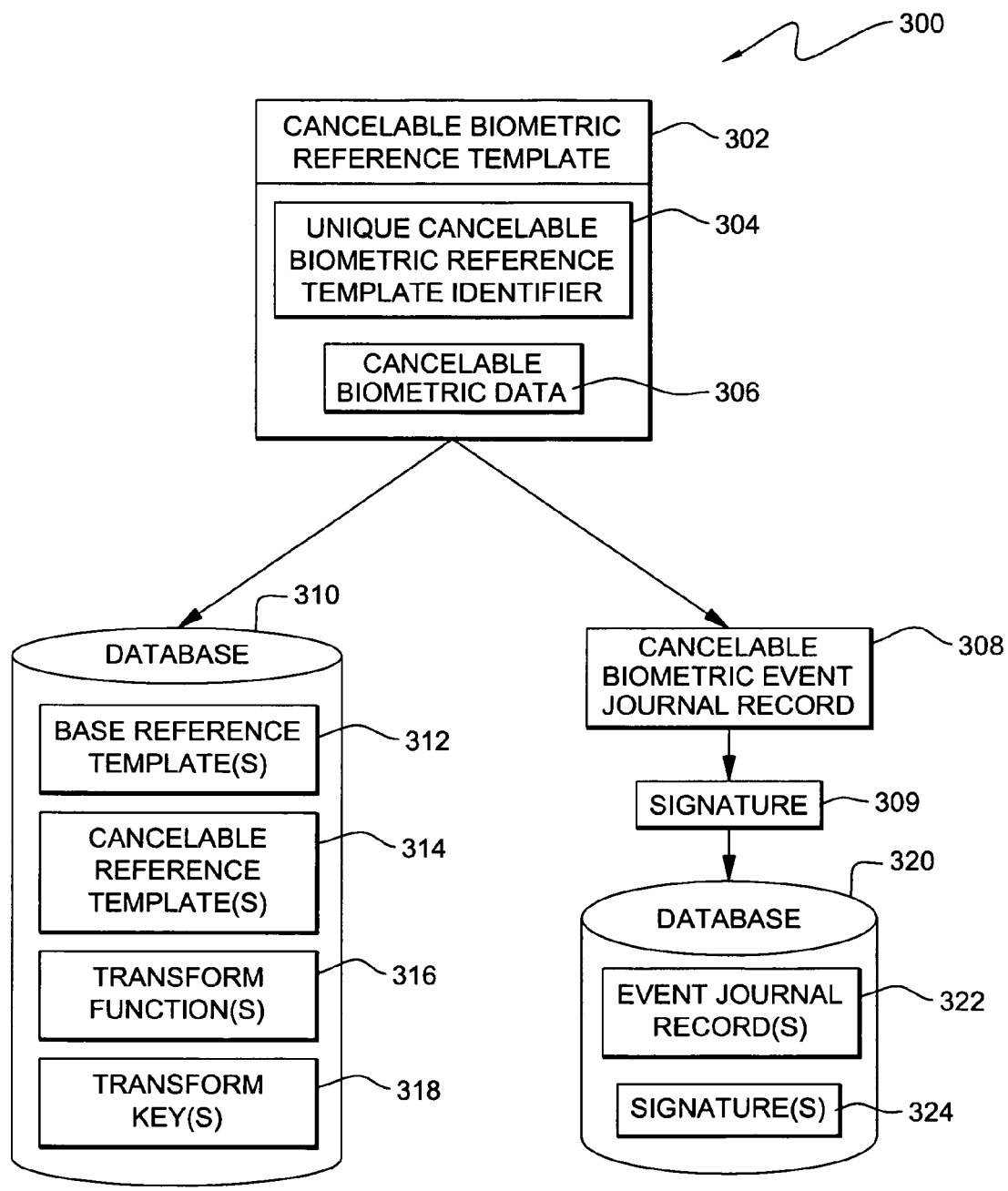
FIG. 3 is a block diagram depicting an aspect of a system for recording the creation of a cancelable or revocable or derivative biometric reference template in a biometric event journal record, in accordance with an embodiment of the present invention.

Reference is now made to FIG. 3, reference numeral 300, which is a block diagram depicting an aspect of a system for recording the creation of a cancelable or revocable or derivative biometric reference template in a biometric event journal record, in accordance with an embodiment of the present invention. As explained herein above with respect to FIGS. 1 and 2, a base biometric reference template is inputted into a data transform or transformation tool deployed on a computer system, where a respective function key value of a data transform function is used to create a respective cancelable or revocable or derivative biometric reference template. In an embodiment, the respective function key value is used only once to create the respective cancelable or revocable or derivative biometric reference template. In an embodiment, the cancelable or revocable or derivative biometric reference template 302 created from a base biometric reference template is assigned a unique cancelable or revocable or derivative biometric reference template identifier 304 for uniquely identifying the cancelable or revocable or derivative biometric reference template 302 created using a data transform function having a function value, as explained herein above with respect to FIG. 2. In an embodiment, the cancelable biometric data 306 obtained from the transformation of the base biometric data in a base biometric reference template 312 is also included in the cancelable or revocable or derivative biometric reference template 302, as shown in FIG. 3. Further, the cancelable or revocable or derivative biometric reference template 302 that is created using a particular set of function key values provided by the data transformation function utilized is stored with other cancelable or revocable or derivative biometric reference templates 314 in a database 310 within the system. In addition, the base biometric reference template is stored with other respective base biometric reference templates 312 used to create respective multiple cancelable or revocable or derivative biometric reference templates 314. In an embodiment, the biometric data contained in each of the base biometric reference templates 312 is encrypted to protect the base biometric reference templates 312 and these reference templates may be optionally signed with a digital signature (as discussed herein above with respect to FIG. 2) before being stored in the database 310. Furthermore, respective data transform functions 316 and respective transform keys 318 used to create the multiple cancelable or revocable or derivative biometric reference templates may also be stored in database 310 within the system. In addition, as shown in FIG. 3, the creation of the cancelable or revocable or derivative biometric reference template 302 is recorded in a cancelable biometric event journal record 308. Further, the cancelable biometric event journal record 308 created for the cancelable or revocable or derivative biometric reference template 302 is stored in a separate database 320 of the system 300 along with other biometric event journal records 322 created when recording or logging the creation of one or more cancelable or revocable or derivative biometric reference templates for other user/individuals within the system 300. In an embodiment, the cancelable biometric event journal record 308 is signed with a digital signature 309 before being stored as event journal records 322 in database 320, and the digital signature is also stored (reference numeral 324) in database 320. In an embodiment, a RSA digital signature scheme is used to sign the cancelable biometric event journal record 308, such that, the digital signature provides integrity protection over the entire cancelable biometric event journal record 308. The use of digital signatures to sign objects to be authenticated is well known in the art and, as such, will not be discussed further herein. In an embodiment, a respective base biometric reference template used to create a respective cancelable or revocable or derivative biometric reference template may itself be placed in the cancelable biometric event journal record 308 and, if the base biometric reference template is placed in the cancelable biometric event journal record 308, the biometric data contained in the cancelable biometric reference template is protected using encryption or some other means for preventing the information from being captured and used to create unauthorized cancelable or revocable or derivative biometric reference templates that could be used to impersonate an individual, thus, protecting the privacy of the individual whose biometric sample was used to create the base biometric reference template. In an embodiment, the cancelable biometric event journal record created for a cancelable or revocable or derivative biometric reference template creation includes an identification of the cancelable or revocable or derivative biometric reference template being created, the base biometric data (or base reference template containing the biometric data) being transformed to produce the cancelable or revocable or derivative biometric reference template, the transform function, and the transform key used for creating the cancelable or revocable or derivative biometric reference template, as discussed further herein below with respect to FIG. 7. In an embodiment, the new cancelable or revocable or derivative biometric reference template adheres to international standards for the format of biometric reference templates and, as such, the unique cancelable or revocable or derivative biometric reference template identifier comprises a universally unique identifier (UUID), which can be placed in the event journal record to uniquely identify the template. Further, if the data transformation function is recorded in the biometric event journal record, the transform function is protected, either by encryption or other appropriate means in the biometric event journal record. Alternatively, an identifier that names the data transform function can be recorded in the biometric event journal record as plaintext or clear text. Further, if the function key values are recorded in the biometric event journal, the function keys may be recorded as plaintext or clear text. Additionally, in an embodiment, all instances of a cancelable or revocable or derivative biometric reference template created by the system from a base biometric reference template of an individual are recorded in the cancelable biometric event journal record 308. Such recording of events in the cancelable biometric event journal record 308 facilitates detection of duplicate cancelable or revocable or derivative biometric reference templates and prevents duplicate cancelable or revocable or derivative biometric reference templates from being issued. Further, recording of the creation of each cancelable or revocable or derivative biometric reference template allows individual cancelable or revocable or derivative biometric reference template to be revoked, and helps in detecting the use of unauthorized cancelable or revocable or derivative biometric reference templates for purposes of impersonating an individual.

Figure 4:
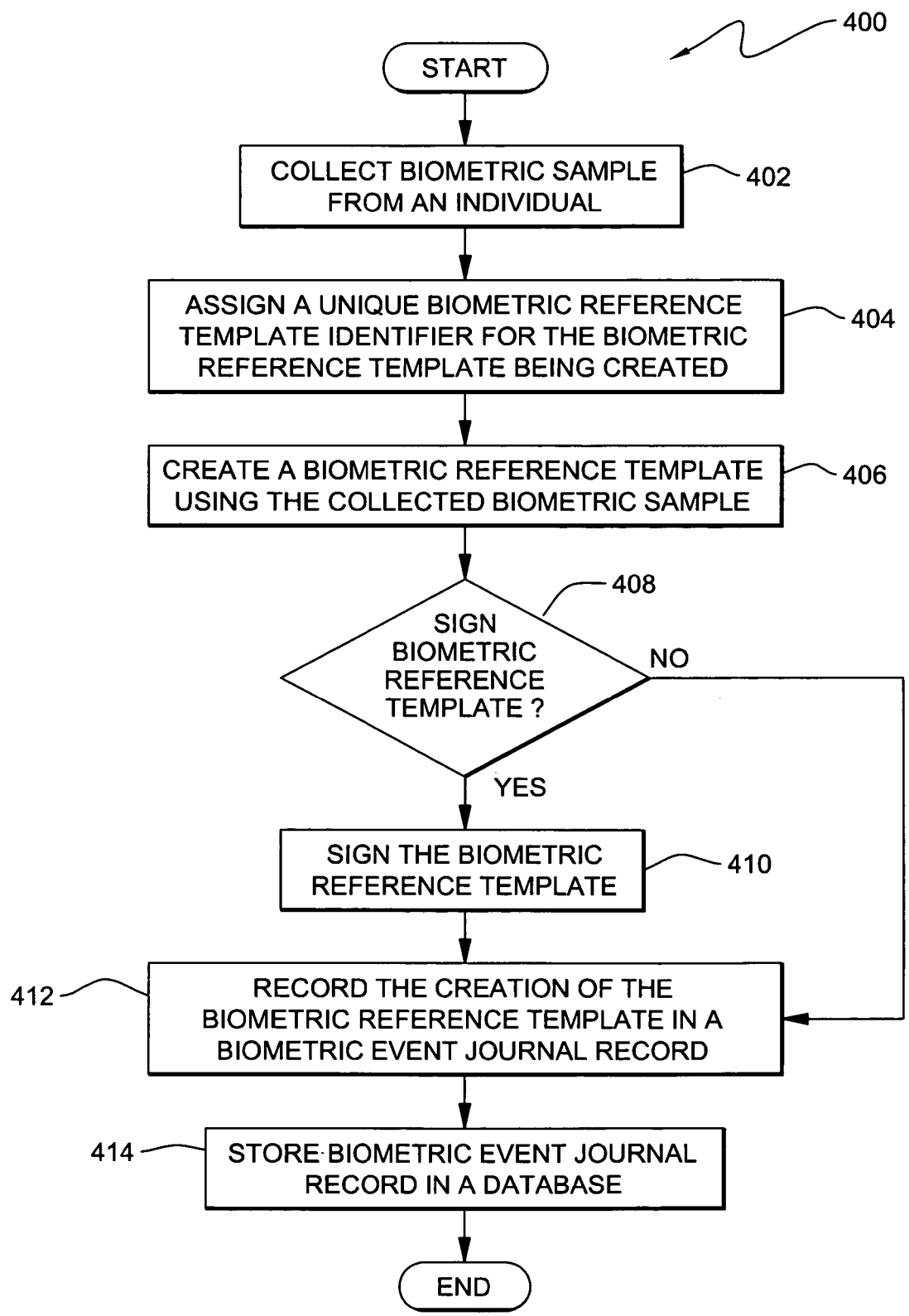
FIG. 4 is a block diagram depicting an embodiment of a system for recording in a biometric event journal record the creation of a biometric reference template, in accordance with an embodiment of the present invention.

In another embodiment, the invention provides a method for recording in a biometric event journal record the creation of a base biometric reference template, in accordance with an embodiment of the invention. Turning to FIG. 4, reference numeral 400 depicts a flowchart outlining the steps for recording in a biometric event journal record the creation of a base biometric reference template for an individual being registered with a system. As shown in FIG. 4, the process begins with a biometric application within a biometric reader or scanner device collecting in step 402 a biometric sample from an individual to create a base biometric reference template within the system. In step 404, a unique base biometric reference template identifier is assigned to the base biometric reference template being created and the base biometric reference template is created in step 406 using the biometric sample collected from the individual. In step 408, a determination is made by the biometric application as to whether or not to sign the base biometric reference template created. If the biometric application receives input indicating that the base biometric reference template is to be signed, then the base biometric reference template is signed in step 410 using a digital signature. The use of digital signatures to sign objects to be authenticated is well known in the art. The creation of the base biometric reference template, which is signed, is recorded in a biometric event journal record in step 412. Going back to step 408, if a determination is made that the base biometric reference template is not to be signed, then the creation of the base biometric reference template is recorded in the biometric event journal record in step 412. In an embodiment, the biometric event journal record created for a base biometric reference template includes an identification (for instance, the unique base biometric reference template identifier) of the base biometric reference template created and the base biometric data processed from the individual's biometric sample collected. Further, the biometric event journal record created for the base biometric reference template is stored in a database in step 414, ending the process.

Figure 5:
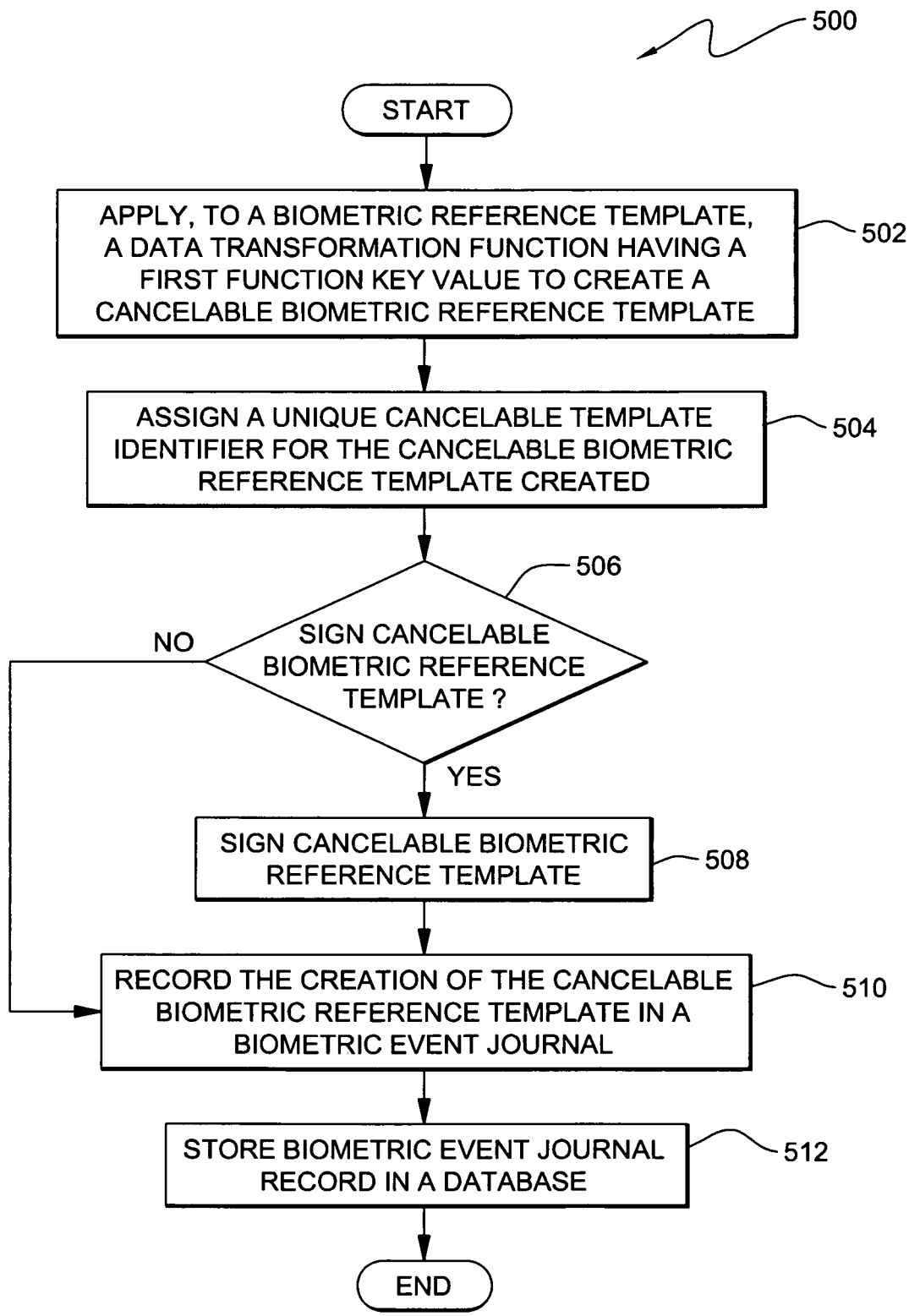
FIG. 5 depicts a flowchart outlining the steps for recording in a biometric event journal record the creation of a cancelable or revocable or derivative biometric reference template, in accordance with an embodiment of the present invention.

Reference is now made to FIG. 5, reference numeral 500, which depicts a flowchart outlining the steps for recording in a biometric event journal record the creation of a cancelable or revocable or derivative biometric reference template, in accordance with an embodiment of the present invention. The process begins in step 502 with a biometric application applying to a base biometric reference template a data transform function or data transformation function having a first function key value or transformation key in order to create a cancelable or revocable or derivative biometric reference template. Further, in step 504, a unique cancelable or revocable or derivative biometric reference template identifier is assigned to the cancelable or revocable or derivative biometric reference template created using the data transformation function. In step 506, a determination is made by the biometric application as to whether or not to sign the cancelable or revocable or derivative biometric reference template that is created. If the biometric application receives input indicating that the cancelable or revocable or derivative biometric reference template is to be signed, then the cancelable or revocable or derivative biometric reference template is signed in step 508 using a digital signature. Alternatively, the cancelable biometric data within a cancelable or revocable or derivative biometric reference template can be protected using other appropriate means, such as, encryption. The creation of the cancelable or revocable or derivative biometric reference template, which is signed, is recorded in a biometric event journal record in step 510. Going back to step 506, if a determination is made that the cancelable or revocable or derivative biometric reference template is not to be signed, then the creation of the cancelable or revocable or derivative biometric reference template is recorded in the biometric event journal record in step 510. In an embodiment, the biometric event journal record created for a cancelable or revocable or derivative biometric reference template creation includes an identification of the cancelable or revocable or derivative biometric reference template being created, the base biometric data (or base reference template containing the biometric data) being transformed to produce the cancelable or revocable or derivative biometric reference template, the transform function, and the transform key used for creating the cancelable or revocable or derivative biometric reference template, as discussed further herein below with respect to FIG. 7. Further, during creation of the cancelable or revocable or derivative biometric reference template, the biometric service provider is provided a date that the cancelable or revocable or derivative biometric reference template is set to expire, so that the relying party can use the validity date to tell whether or not the cancelable or revocable or derivative biometric reference template is still valid. Referring back to FIG. 5, the biometric event journal record created for the cancelable or revocable or derivative biometric reference template is stored in a database in step 512, ending the process. Optionally, the biometric event journal record may be encrypted and/or signed with a digital signature before being stored in a database.

Figure 6:
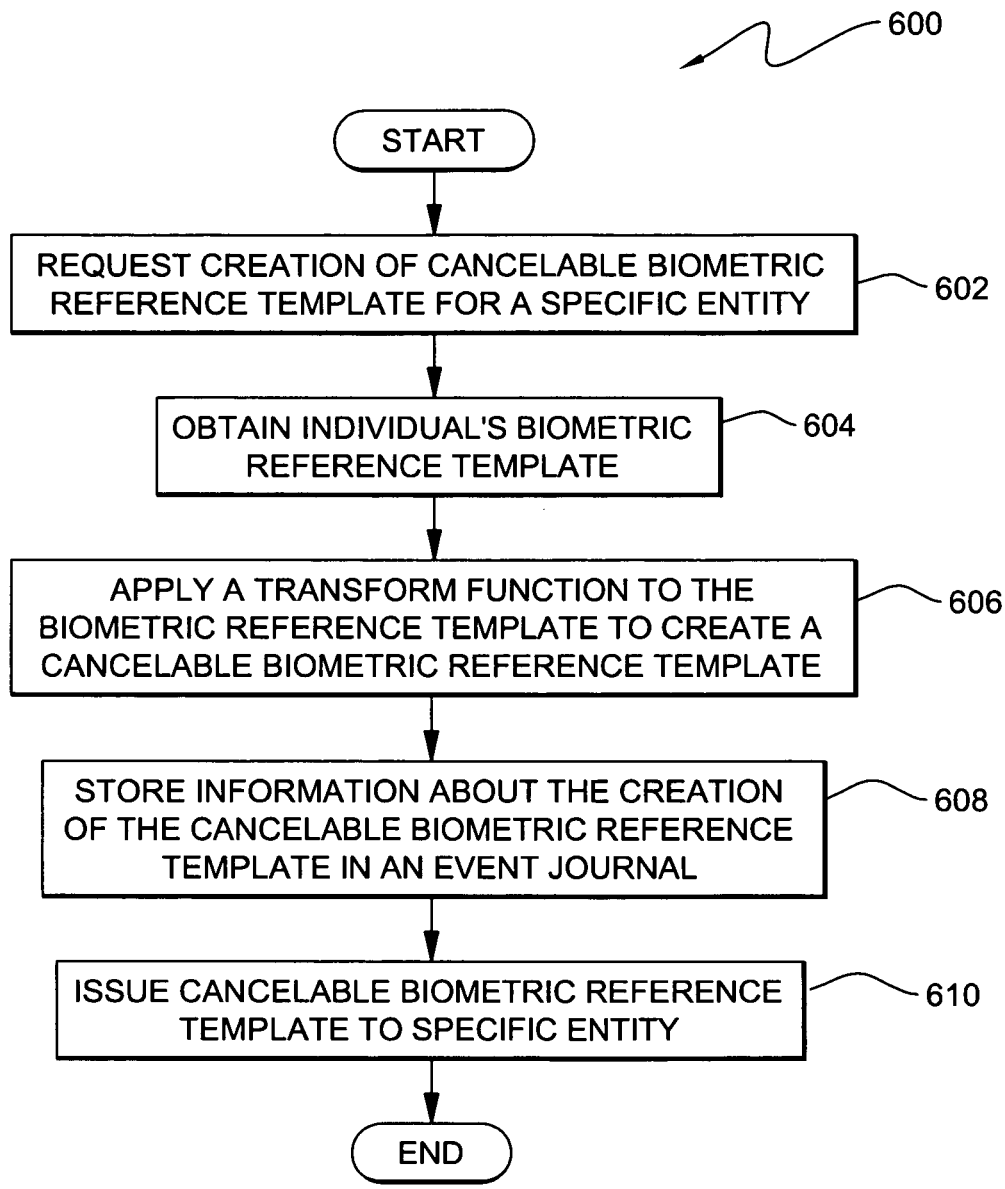
FIG. 6 depicts a flowchart outlining the steps for issuing to an entity a cancelable or revocable or derivative biometric reference template created, in accordance with an embodiment of the present invention.

Reference is now made to FIG. 6, reference numeral 600, which depicts a flowchart outlining the steps for issuing to an entity a cancelable or revocable or derivative biometric reference template created, in accordance with an embodiment of the present invention. The process begins in step 602 with an individual or user requesting creation by a biometric service provider of a cancelable or revocable or derivative biometric reference template for a specific entity (for instance, a bank). The biometric service provider obtains in step 604 the individual's base biometric reference template that was created during the time the individual was initially enrolled in a system. Further, the biometric service provider accessing a biometric application within the system applies, in step 606, a data transform function or data transform function to the base biometric reference template to create a cancelable or revocable or derivative biometric reference template. Further, information pertaining to the creation of the cancelable or revocable or derivative biometric reference template is stored in a biometric event journal record in step 608. In step 610, the biometric service provider issues a cancelable or revocable or derivative biometric reference template to the specific entity, ending the process. Again, as mentioned herein above, the cancelable biometric reference template may optionally be encrypted and/or signed with a digital signature. Similarly, the cancelable biometric event journal record may be encrypted and/or signed with a digital signature.

For example, an individual that has previously enrolled in a biometric system using a particular biometric service provider may want to create a cancelable or revocable or derivative biometric reference template to enroll with a new entity. Thus, the individual calls the biometric service provider and requests creation of the cancelable or revocable or derivative biometric reference template for a specific party. Accordingly, the biometric service provider accesses the base biometric reference template created for the individual and applies the data transform function to create a cancelable or revocable or derivative biometric reference template, which is issued to the specific party. The transformation function and the resulting cancelable or revocable or derivative biometric reference template is stored in the biometric event journal record. While each of the cancelable or revocable or derivative biometric reference templates created from a base biometric reference template may have different cancelable biometric data, each cancelable or revocable or derivative biometric reference template matches the individual.

Figure 7:
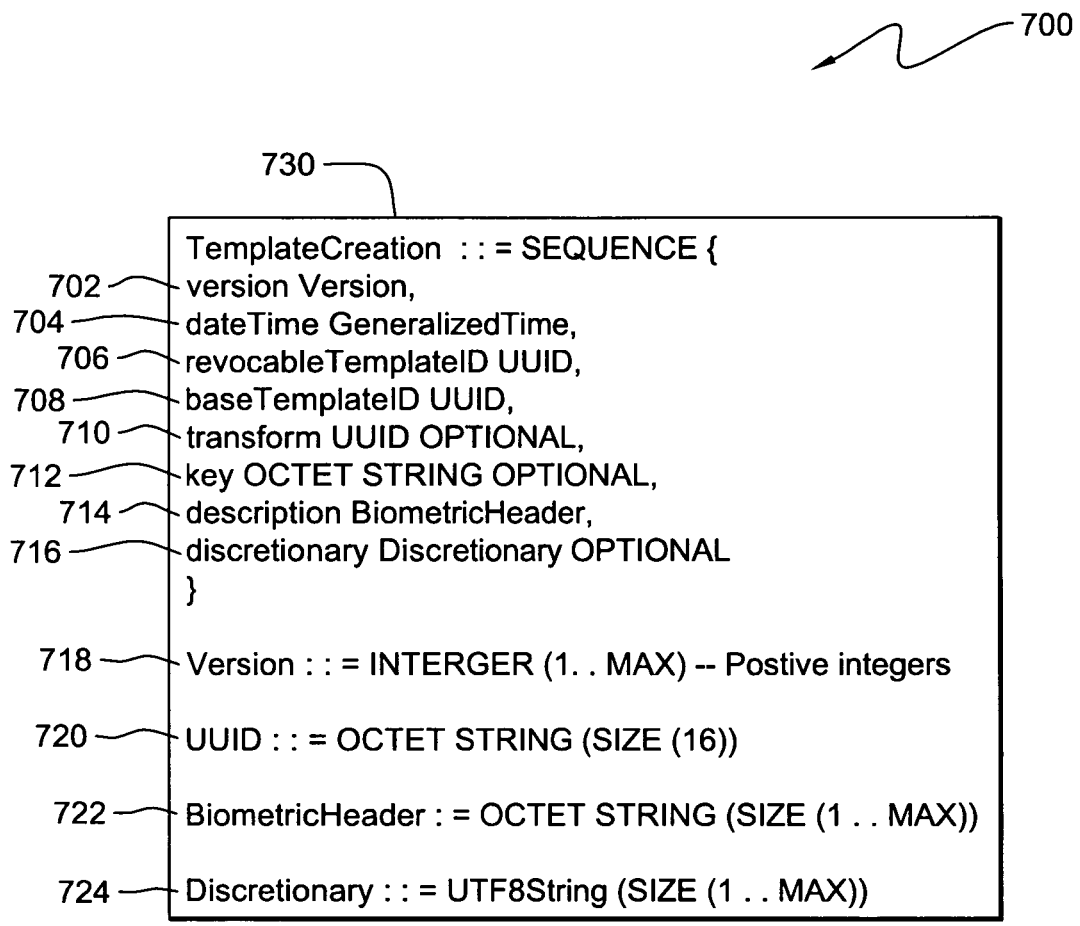
FIG. 7 depicts an embodiment for creating a definition for a cancelable or revocable or derivative biometric reference template event journal record, in accordance with an embodiment of the present invention.

Turning to FIG. 7, reference numeral 700 depicts an embodiment for creating a definition for a cancelable or revocable or derivative biometric reference template event journal record, in accordance with an embodiment of the present invention. A cancelable biometric template event journal record 700 can be defined in many ways, including the format shown in FIG. 7 that conforms to the standard set forth in the X9.84:2008 standard revision. In particular, "version" (reference numeral 702) refers to the version of the "TemplateCreation" syntax, which version is specified as being the integer value one (reference numeral 718). Further, "dateTime" (reference numeral 704) is the date and time of the event, namely, the creation of the revocable or derivative or cancelable biometric reference template being recorded in the biometric event journal record. The syntax "revocableTemplateID" (reference numeral 706) refers to a universally unique identifier, UUID (reference numeral 720) of the new revocable or derivative or cancelable biometric reference template being created. The syntax "baseTemplateID" (reference numeral 708) refers to a universally unique identifier of a base biometric reference template used to create the revocable or derivative or cancelable biometric reference template. Further, the syntax "transform" (reference numeral 710) refers to a universally unique identifier (UUID) of the transformation function used to modify or transform the base biometric reference template. The syntax "key" (reference numeral 712) is an array of transform function values used to create a unique cancelable or revocable or derivative biometric reference template. Further, the syntax "description" (reference numeral 714) refers to the value of the BiometricHeader (reference numeral 722) of the new cancelable or revocable or derivative biometric reference template being created. Finally, the syntax "discretionary" (reference numeral 716) refers to discretionary text (reference numeral 724) that may be included with the biometric event journal record.

Accordingly, the invention provides a system, method and a program product for recording the creation of a cancelable or revocable or derivative biometric reference template in a biometric event journal record (an audit log), in accordance with an embodiment of the invention. The invention provides the ability to create more than one cancelable or revocable or derivative biometric reference templates from a base biometric reference template using a mathematical transformation on a base biometric reference template. As such, more than one cancelable or revocable or derivative biometric reference templates can be created using a matrix of integer values provided in a data transformation function without the individual having to go back and provide a biometric sample again for enrolling in a biometric system used by an entity. The transform values can be varied and applied to a base biometric reference template to get a cancelable or revocable or derivative biometric reference template. Reports may be generated based on the biometric event journal records or audit logs, which can be used to monitor the quality of the biometric service provided. Further, the biometric event journal record may include the date and time, the operator who created the cancelable or revocable or derivative biometric reference template, the identifier of the cancelable or revocable or derivative biometric reference template and the recipient of the cancelable or revocable or derivative biometric reference template. Additionally, the type of encryption used, etc. may also be stored in the biometric event journal record, so that an auditor could use the journal record to ascertain whether or not the creation process for a cancelable or revocable or derivative biometric reference template was well managed.

The foregoing descriptions of specific embodiments of the present invention have been presented for the purpose of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for recording creation of a cancelable biometric reference template, said method comprising:
   creating, by a processor of a computer system, a base biometric reference template, said creating comprising inserting, into the base biometric reference template, a unique base biometric reference template identifier that uniquely identifies base biometric data collected for an individual, the base biometric data, and a biometric type indicator providing an indication of a portion of the individual's body used for collecting the base biometric data;
   said processor applying a data transform function having a function key value to the base biometric reference template to create a cancelable biometric reference template; and
   said processor recording the cancelable biometric reference template in a biometric event journal record.

2. The method of claim 1, said method further comprising:
   said processor signing the cancelable biometric reference template with a digital signature.

3. The method of claim 1, said method further comprising:
   after said recording, said processor signing the biometric event journal record with a digital signature.

4. The method of claim 1, said method further comprising:
   said processor encrypting the data transform function applied to the base biometric reference template; and
   said processor encrypting the function key value.

5. The method of claim 1, said method further comprising:
   said processor inserting into the biometric event journal record: the biometric reference template, the cancelable biometric reference template, the data transform function, and the data transform function key value.

6. A process for deploying computing infrastructure comprising integrating computer-readable code into a computer system, wherein said the code in combination with said computer system is capable of performing a method for recording creation of a cancelable biometric reference template, said method comprising:
   creating, by a processor of the computer system, a base biometric reference template, said creating comprising inserting, into the base biometric reference template, a unique base biometric reference template identifier that uniquely identifies base biometric data collected for an individual, the base biometric data, and a biometric type indicator providing an indication of a portion of the individual's body used for collecting the base biometric data;
   said processor applying a data transform function having a function key value to the base biometric reference template to create a cancelable biometric reference template; and
   said processor recording the cancelable biometric reference template in a biometric event journal record.

7. The process of claim 6, said method further comprising:
   said processor signing the cancelable biometric reference template with a digital signature.

8. The process of claim 6, said method further comprising:
   after said recording, said processor signing the biometric event journal record with a digital signature.

9. The process of claim 6, said method further comprising:
   said processor encrypting the data transform function applied to the base biometric reference template; and
   said processor encrypting the function key value.

10. The process of claim 6, said method further comprising:
said processor inserting into the biometric event journal record: the biometric reference template, the cancelable biometric reference template, the data transform function, and the data transform function key value.

11. A computer system comprising a processor, a memory coupled to the processor, and a computer readable storage device coupled to the processor, said storage device containing program code configured to be executed by the processor via the memory to implement a method for recording creation of a cancelable biometric reference template, said method comprising:
said processor creating a base biometric reference template, said creating comprising inserting, into the base biometric reference template, a unique base biometric reference template identifier that uniquely identifies base biometric data collected for an individual, the base biometric data, and a biometric type indicator providing an indication of a portion of the individual's body used for collecting the base biometric data;
said processor applying a data transform function having a function key value to the base biometric reference template to create a cancelable biometric reference template; and
said processor recording the cancelable biometric reference template in a biometric event journal record.

12. The computer system of claim 11, said method further comprising:
said processor signing the cancelable biometric reference template with a digital signature.

13. The computer system of claim 11, said method further comprising:
after said recording, said processor signing the biometric event journal record with a digital signature.

14. The computer system of claim 11, said method further comprising:
said processor encrypting the data transform function applied to the base biometric reference template; and
said processor encrypting the function key value.

15. The computer system of claim 11, said method further comprising:
said processor inserting into the biometric event journal record the biometric reference template, the cancelable biometric reference template, the data transform function, and the data transform function key value.

16. A computer program product, comprising a computer readable storage device having a computer readable program code stored therein, said program code configured to be executed by a processor of a computer system to implement a method for recording creation of a cancelable biometric reference template, said method comprising:
said processor creating a base biometric reference template, said creating comprising inserting, into the base biometric reference template, a unique base biometric reference template identifier that uniquely identifies base biometric data collected for an individual, the base biometric data, and a biometric type indicator providing an indication of a portion of the individual's body used for collecting the base biometric data;
said processor applying a data transform function having a function key value to the base biometric reference template to create a cancelable biometric reference template; and
said processor recording the cancelable biometric reference template in a biometric event journal record.

17. The computer program product of claim 16, said method further comprising:
said processor signing the cancelable biometric reference template with a digital signature.

18. The computer program product of claim 16, said method further comprising:
after said recording, said processor signing the biometric event journal record with a digital signature.

19. The computer program product of claim 16, said method further comprising:
said processor encrypting the data transform function applied to the base biometric reference template; and
said processor encrypting the function key value.

20. The computer program product of claim 16, said method further comprising:
said processor inserting into the biometric event journal record the biometric reference template, the cancelable biometric reference template, the data transform function, and the data transform function key value.

\* \* \* \* \*